3,514,418
EPOXY ETHERS, THEIR PREPARATION AND
CURED PRODUCTS OBTAINED THEREFROM
Carl G. Schwarzer, Walnut Creek, Calif., assignor to Shell
Oil Company, New York, N.Y.; a corporation of Delaware
No Drawing. Continuation-in-part of application Ser. No. 324,621, Nov. 19, 1963. This application July 5, 1968, Ser. No. 742,520
Int. Cl. C08g 5/18, 51/52, 37/14
U.S. Cl. 260—28                          12 Claims

ABSTRACT OF THE DISCLOSURE

The present invention relates to new epoxy ethers, their preparation and cured products obtained therefrom. These new epoxy ethers comprise ethers of epoxy substituted alcohols and polyhydric phenols having at least two methylol groups attached to different aromatic ring carbon atoms, such as, for example, the diglycidyl ether of 2,2-bis(3,5-dimethylol-4-hydroxyphenyl)propane. These new ethers are preferably prepared by reacting the methylolated polyhydric phenol with an epoxy-forming material such as epichlorohydrin in the presence of caustic. Cured products are produced by reacting the above-described new epoxy ethers with epoxy resin curing agents.

---

This application is a continuation-in-part of Ser. No. 324,621, filed Nov. 19, 1963, now abandoned.

This invention relates to a new class of epoxy compounds and to a method for their preparation. More particularly, the invention relates to new epoxy ethers of substituted polyhydric phenols, to their preparation and utilization, particularly in the formation of valuable cured products.

Specifically, the invention provides a new class of epoxy ethers which have surprisingly fast cure rates and give cured products having outstandingly higher heat resistance. The new ethers of the invention comprise ethers of epoxy-substituted alcohols and polyhydric phenols, and preferably polynuclear polyhydric phenols, having at least two methylol groups attached to different aromatic ring carbon atoms, such as, for example, diglycidyl ether of 2,2-bis(3,5-dimethylol-4-hydroxyphenyl)propane. These new ethers are preferably prepared by reacting the methylol-substituted polyhydric phenol with an epoxy-forming material of the group consisting of epoxy-halo-substituted compounds, e.g., epichlorohydrin, and dihalo-hydroxy-substituted compounds, e.g., dichlorohydrin, in the presence of caustic.

As as special embodiment, the invention provides new polyepoxides comprising glycidyl ethers of methylol-substituted polyhydric phenols, and particularly those of the formula

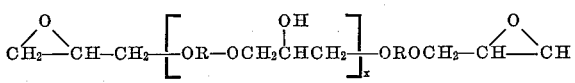

wherein at least one R radical contains a dimethylol-substituted aromatic ring and the remaining R's are dissimilar aromatic radicals, and $x$ is an integer of 0 to 10. Of special importance are those compounds of the above-described formula wherein R is a substituted or unsubstituted polynuclear aromatic radical.

The invention further provides new and particularly useful insoluble infusible cured products obtained by reacting the above-described new epoxy ethers with epoxy resin curing agents, such as polyamines, polycarboxylic acids and anhydrides, boron trifluoride and its complexes, inorganic acids, metal salts, hydrazides, polymercaptans, urea-formaldehyde and phenol-formaldehyde resins and the like.

Epoxy ethers of unsubstituted polyhydric phenols, such as glycidyl ethers of 2,2-bis(4-hydroxyphenyl)propane, have been in commercial use for some time. They find wide use in the preparation of surface coatings, adhesives, moldings and castings and the like. These materials, however, have certain disadvantages which have limited applications. It has been found, for example, that considerable time is required to cure the resins at the lower temperatures. This prevents their use for certain types of coatings, such as those to be applied to roads, and the like. In addition, the cured resins do not have the heat resistance required for the new applications in missiles and rocketry.

It is an object of the invention, therefore, to provide new epoxy ethers. It is a further object to provide new epoxy ethers of substituted phenols and a method for their preparation. It is a further object to provide new epoxy ethers of methylol-substituted phenols which have many improved properties. It is a further object to provide new epoxy ethers which can be cured rapidly at low temperatures. It is a further object to provide new epoxy ethers which can be cured to give products having outstanding heat resistance. It is a further object to provide new epoxy ethers which give cured products having outstanding solvent and chemical resistance. It is a further object to provide new epoxy ethers which can be used to give excellent surface coatings and castings. These and other objects of the invention will be apparent from the following description thereof.

It has now been discovered that these and other objects may be accomplished by the new epoxy ethers of the invention comprising ethers of epoxy-substituted alcohols and polyhydric alcohols, and preferably polynuclear polyhydric phenols, having at least two methylol groups attached to different aromatic ring carbon atoms, such as, for example, diglycidyl ether of 2,2-bis(3,5-dimethylol-4-hydroxyphenyl)propane. It has been found that these new epoxy ethers have quite different properties from the unsubstituted epoxy ethers and meet many of the present needs of the epoxy resin industry. It has been found, for example, that these epoxy ethers have surprisingly fast reaction at low temperatures, particularly in combination with polyamines, and can be cured with these materials at a rate which is from 4 to 10 or more times faster than the conventional epoxy resins. This surprising property permits the new epoxy ethers to be used for a wide variety of different applications, particularly in the coating and surface industries. In addition, it has been found that the cured products obtained by reacting the new epoxy ethers with curing agent, and particularly the aromatic polyamine curing agent, have unexpectedly high heat distortion points. The heat distortion points in many cases are from 50° C. to 150° C. higher than those obtained under similar conditions with the unsubstituted glycidyl ethers. This surprising property permits the new epoxy ethers to be used for important casting and molding operations and in the formation of reinforced composites, such as in the filament winding and laminating industries.

The new epoxy ethers are preferably obtained by reacting the desired methylol-substituted polyhydric phenol with an epoxy-forming material, such as epichlorohydrin, in the presence of caustic. The formation of the new epoxy ethers in this manner was also surprising in that it was expected that the methylol groups would react with the epoxy-forming material and would not remain as such. Surprisingly, high yields of the desired epoxy ether with the methylol groups unreacted are obtained by this new technique.

The polyhydric phenols used in making the new epoxy ethers include those having at least two methylol groups attached to different aromatic ring carbon atoms and preferably two to four. These phenols may be mononuclear or polynuclear and may be substituted with non-interfering substituents, such as halogen atoms, ether and ester radicals, alkyl radicals, alkenyl radicals, alkoxy radicals, sulfur, sulfonyl groups, mercaptan groups and the like. The phenols may also be those of the polymeric type such as may be obtained by reacting phenols with formaldehyde (novolac resins).

Examples of the above-described methylol-substituted phenols include, among others, 2,6-dimethylol-1,4-dihydroxybenzene, di(3-methylol-4-hydroxyphenyl)sulfide, di-3-methylol-4-hydroxyphenyl)sulfone, di(3-methylol-4-hydroxyphenyl)methane and methylol-substituted phenol-formaldehyde resins. Other examples include those of the formulae

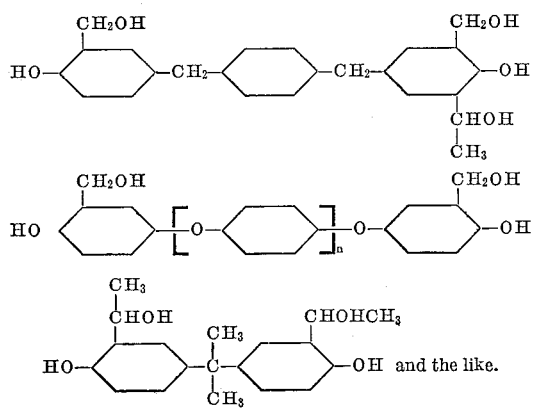

The methylol-substituted phenols described above may be prepared by a variety of suitable methods. They are preferably prepared by reacting the unsubstituted phenol with formaldehyde or a material which liberates formaldehyde in the presence of an alkaline catalyst. The formaldehyde is preferably utilized in the form of an aqueous solution, such as conventional 37% formalin solution. The formaldehyde and phenol are preferably combined in such quantities as to furnish approximately one mol up to 5–10% excess of formaldehyde for every ring carbon atom to be reacted. Thus, the dimethylol-substituted products are obtained by using 2 mols of formaldehyde per mole of the phenol.

The alkaline catalysts employed in the reactant are preferably the alkaline or alkaline earth metal hydroxides, and particularly sodium hydroxide. These catalysts are generally utilized in amounts varying from about .1% to 10% by weight of the reactants.

Solvents may be utilized in the reactions as desired. Suitable solvents are those which are solvents for the phenols such as methanol, ethanol, water-alcohol mixtures, ketones and the like. The amount of solvent employed will vary depending upon the concentration, reactants and the like. In general, the solvent makes up from 10% to 60% by weight of the reactants.

Temperatures employed in the reaction may vary depending upon the desired rate of reaction. The reaction takes place slowly at room temperature or below. Faster rates can be obtained by applying heat. Suitable reaction rates (a few minutes to several hours) are obtained by employing temperatures ranging from about 50° C. to about 100° C.

After the reaction, the alkaline catalyst can be neutralized by addition of acidic material, such as dilute sulfuric or hydrochloric acids, and the solvent can be removed by distillation.

By methylol-substituted as used herein is also meant the substituted methylol groups, such as —CHOHR groups wherein R is preferably hydrocarbon or substituted hydrocarbons as —CHOHCH$_3$—CHOHCH=CH$_2$.

These substituted phenols are obtained by replacing the formaldehyde in the above techniques with the desired aldehyde, such as acetaldehyde, acrolein, chloroal and the like, and use more stringent conditions, such as higher temperature, etc.

The new epoxy ethers are obtained by reacting the above-described methylol-substituted phenols with the epoxy-forming materials such as halo-epoxy-substituted alkanes and dihalo-hydroxy-substituted alkanes, preferably in the absence of water. The expression "halo-epoxy-substituted alkane" used herein refers to those alkanes having a 1,2-epoxy group (otherwise known as a vic-epoxy group) attached directly to a halogen-bearing carbon atom, such as, for example, epichlorohydrin, epibromohydrin, 1,4-dichloro-2,3-epoxybutane, 1-chloro-2,3-epoxypentane, and the like. The expression "dihalo-hydroxy-substituted alkanes" as used herein refers to those alkanes having a series of three carbon atoms one of which is attached to a halogen atom, the next is attached to a hydroxyl group and the last is attached to a halogen atom such as, for example, 1,3-dichloro-2-hydroxypropane, 2,4-dibromo-3-hydroxypentane, 2,3-dichloro-3-hydroxybutane, and the like. Epichlorohydrin comes under special consideration because of its low cost and because of the superior properties of the epoxides obtained therefrom.

As noted, the reaction is preferably conducted in the presence of only small amounts of water. This may be accomplished by adding the epoxy-forming material to the phenol mixture, allowing the mixture to form an aqueous and organic phase and then discarding the aqueous phase.

The amount of the polyhydric phenol and the epoxy-forming material to be employed in the reaction will vary depending upon the type of product desired. If simple monomeric type products are desired, the phenol and epoxy-forming material are preferably reacted in chemical equivalent ratios varying from 1:4 to 1:8. If higher molecular weight hydroxy-containing products are desired, the epoxy-forming materials are used in smaller amounts and the ratio varies from about 1:1.1 to 1:2. As used herein, "chemical equivalent" amounts refers to the amount needed to furnish one OH group for every epoxy group.

Higher molecular weight products prepared from the methylol-substituted dihydric phenols and epichlorohydrin by varying the proportions of reactants as indicated above are preferably those of the formula

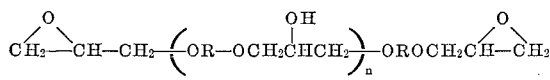

wherein R is the residue of the methylol-substituted dihydric phenol obtained by removing the two OH groups, and $n$ is an integer from 0 to 5.

The desired alkalinity is obtained by adding basic substances, such as sodium or potassium hydroxide. The alkali is employed in at least chemical equivalent amount, e.g., one mole of alkali for every phenolic OH group to be reacted and is preferably used in slight excess.

The above reaction is preferably conducted by heating the mixture at temperatures ranging from about 50° C. to 150° C. and more preferably from about 60° C. to 125° C. Atmospheric, superatmospheric, or subatmospheric pressures may be utilized as desired.

The water formed in the reaction may be removed during or at the end of the reaction. At the completion of the reaction, the water and excess reactants, such as excess halo-epoxy-substituted alkanes are preferably removed by distillation and the residue that remains then treated with an appropriate solvent, such as benzene, and filtered to remove the salt. The product that remains may then be purified by any suitable method, such as extraction, distillation, and the like.

The new epoxy ethers of the present invention are fluid or viscous liquids to solids. They have more than one epoxy group per molecule and are substantially free of chlorine, i.e., contain less than 1% to 2% chlorine. In addition to the active epoxy groups, the new ethers have at least two highly reactive methylol groups which may undergo further reaction. The new epoxy ethers are in general soluble in most solvents, such as ketones, alcohols, and liquid hydrocarbons and are compatible with many synthetic oils and resins.

The new epoxy ethers of the present invention may be exemplified by the following:

diglycidyl ether of 2,2-bis(3,5-dimethylol-4-hydroxyphenyl)propane,
diglycidyl ether of 2,2-bis(2,3,5-trimethylol-4-hydroxyphenyl)butane,
di(3,4-epoxycyclohexyl)ether of 2,2-bis(3,4-dimethylol-4-hydroxyphenyl) hexane,
diglycidyl ether of 2,6-dimethylol-1,4-dihydroxybenzene.

The preferred epoxy ethers are the glycidyl ethers of phenol of the formula

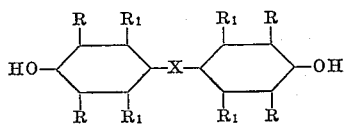

wherein X is a bivalent radical containing elements only of the group consisting of hydrogen, carbon, halogen, sulfur and oxygen, at least two R's are a methylol or alcohol-containing group with the remaining R's and $R_1$ being a member of the group consisting of hydrogen, hydrocarbon radicals, alkoxy radicals and carboalkoxy radicals containing no more than 12 carbon atoms.

For certain applications it is sometimes desirable to have higher molecular weight epoxy resins. Such products may be obtained by varying the amount of the methylol-substituted polyhydric phenol and halo-epoxy-substituted alkane in the alkaline medium as described above, or by reacting the above-described new epoxy resins with poly-epoxides, polyhydric compounds, and the like. In this case, the polyhydric compounds react with the epoxy group

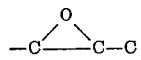

to form a

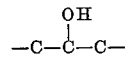

group. Higher molecular weight products may be obtained from diglycidyl ether of 2,2-bis(3,5-dimethylol-4-hydroxyphenyl)propane, for example, by reacting X moles of that compound with Y moles of the polyhydric phenol having XOH groups. Such products have the formula

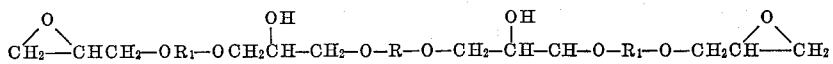

wherein R is the residue of the added polyhydric phenol and $R_1$ is the residue of the methylol-substituted phenol, and $n$ is an integer representing the number of OH groups on the polyhydric phenol molecule. Polyhydric compounds used for this purpose may be any of the above-described polyhydric phenols used in making the methylol-substituted phenols, such as, for example, as resorcinol, catechol, hydroquinine, methyl resorcinol, polynuclear phenols, such as 2,2-bis(4 - hydroxyphenyl)-propane and 1,1,2,2 - tetrakis(4 - hydroxyphenyl)ethane, and polyhydric alcohols, such as glycerol, ethylene glycol, 1,4-butanediol, 1,2,6-hexanetriol, pentaerythritol and the like.

The new epoxy ethers and their higher molecular weight derivatives may be polymerized through the epoxy group to form valuable polymeric products. They may be polymerized alone or with other polyepoxide materials in a variety of different proportions, such as, for example, with amounts of other polyepoxides varying from 5% to 59% by weight. Polyepoxides that may be copolymerized with these new epoxides include, among others, glycidyl polyethers of polyhydric phenols obtained by reacting polyhydric phenols, such as bisphenol, resorcinol, and the like, with an excess of chlorohydrin, such as epichlorohydrin, polyepoxide polyethers obtained by reacting an alkane polyol, such as glycerol and sorbitol, with epichlorohydrin and dehydrohalogenating the resulting product, polymers prepared from ethylenically unsaturated epoxides, such as allyl glycidyl ether, alone or with other ethylenically unsaturated monomers, and polyepoxide polyethers obtained by reacting a polyhydric alcohol or polyhydric phenol with any of the above-described polyepoxides. The glycidyl polyethers of polyhydric phenols obtained by condensing the polyethers of polyhydric phenols with epichlorohydrin as described above are also referred to as "ethoxyline" resins. See Chemical Week, vol. 69, page 27, for Sept 8, 1951.

A great variety of different curing agents may be employed in effecting the above-described homo- and co-polymerization. Such agents include, among others, carboxylic acids or anhydrides, such as oxalic acid, phthalic anhydride; Friedel-Crafts metal halides, such as aluminum chloride, zinc chloride, ferric chloride or boron trifluoride as well as complexes thereof with ethers, acid anhydrides, ketones, diazonium salts, etc.; phosphoric acid and partial esters thereof including n-butyl orthophosphate, diethyl orthiophosphate and hexaethyl tetraphosphate; amino compounds, such as triethylamine, ethylene diamine, diethylamine, dicyandiamide, melamine; and salts of inorganic acids, such as zinc fluoborate, potassium persulfate, nickel fluoborate, copper fluoborate, selenium fluoborate, magnesium fluoborate, tin fluoborate, potassium perchlorate, cupric sulfate, cupric phosphate, cupric phosphite, magnesium arsenate, magnesium sulfate, cadmium arsenate, cadmium silicate, aluminum fluoborate, ferrous sulfate, ferrous silicate, manganese hypophosphite, nickel phosphate and nickel chlorate, hydrazides and the like and mixtures thereof.

Examples of other curing agents include the aromatic amines, such as, for example, diaminodiphenylmethane, p,p'-aminodiphenylsulfone, triaminobenzene, ortho-, meta- and paraphenylene diamine, methylene dianiline, diaminotoluene, diaminodiphenyl, diaminostilbene, 1,3-diamino-4-isopropylbenzene, and 1,3-diamino-4,5-diethylbenzene and the like, and mixtures thereof.

Examples of other curing agents include the amino hydrogen-containing polyamides, such as described in U.S. 2,450,940 and U.S. 2,695,908, the N-aminoalkylpiperazines, such as N-aminoethylpiperazines, the acetone-soluble adducts of monoepoxides and polyepoxides, the acetone-soluble adducts of polyepoxides and monoamines, the acetone-soluble adducts of polyamines and unsaturated nitriles, aliphatic polyamines of the formula $$H_2N(RNH)_nH$$

wherein R is an alkylene radical and $n$ is an integer of at least one, such as diethylene triamine, triethylene tetramine, tetraethylene pentamine and the like, as well as other amines, such as N,N'-diethyl-1,3-propanediamine, tetra(1,3 - dimethylpropylene)pentamine and the like.

Other examples include the anhydrides, such as tetrahydrophthalic anhydride, methyl Nadic anhydride, chlorendic anhydride, pyromellitic anhydride, trimellitic anhydride, phthalic anhydride, succinic anhydride, maleic anhydride, octadecenylsuccinic anhydride and the like, and mixtures thereof.

Other examples include the boron trifluoride complexes such as described in U.S. 2,824,083.

The amount of the curing agents employed may vary over a considerable range depending upon the agent selected. With catalytic-type curing agents, one preferably employs from about .1% to 10% by weight of the material being cured. With curing agents having replaceable hydrogen, such as the amine agents, which enter the reaction, amounts of agent employed vary from about .6 to 1.5 equivalent proportions, i.e., an equivalent proportion being sufficient curing agent to furnish a replaceable hydrogen atom for every epoxy group to be reacted. In general, satisfactory cures are obtained with amounts varying from 1% to 25% by weight of the material being polymerized.

The epoxy ethers and their high molecular weight derivatives may also be cured through the hydroxy group by the addition of appropriate amounts, e.g., 1% to 25% by weight of polybasic acids or anhydrides, polyisocyanates, and the like.

The curing is preferably effected by mixing the curing agent with the epoxy ether at temperatures ranging from about 0° C. to 200° C. The curing is accelerated by heat and when fast cures are desired, temperatures ranging from about 50° C. to 200° C. are used. However, as noted above, one of the great advantages of the new epoxy compounds is their ability to cure at low temperatures. In this case, the cure is preferably effected at temperatures of about 0° C. to 60° C. and still more preferably at 20° C. to 50° C.

In some cases, and particularly in the preparation of castings, the new epoxy ethers will be soft to brittle solids and it may be advantageous to employ some type of diluent during their utilization. These diluents are preferably of the reactive type, i.e., those which may enter the reaction. Examples of these include the monoglycidyl compounds, such as the alkyl glycidyl ethers as butyl glycidyl ethers or aryl glycidyl ethers as phenyl glycidyl ether. Other examples include the glycidyl ethers of dihydropyranalkanols, acetonitrile, acrylonitrile, as well as fluid polyepoxide materials, such as diglycidyl aniline. These materials are preferably used in amounts from about .1% to as high or higher than 30% by weight.

It was surprisingly found that, with many of the above-noted diluents, the diluent in moderate amount does not destroy any of the superior properties but permits such properties to be obtained without any detrimental effect. This is shown in the examples at the end of the specification.

If the epoxy ethers and their higher molecular weight derivatives are to be used in the preparation of castings or pottings, the curing agent and the epoxy material are generally combined together and then poured into the desired mold or casting containing the electrical wires or apparatus and the mixture heated to effect the cure.

The new epoxy ethers of the invention and their higher molecular weight derivatives are particularly suitable, because of their fast rate of cure at the lower temperatures, for the preparation of surface coating compositions. In utilizing the products for this application, it is generally desirable to combine the epoxy resin and curing agent with the desired solvent or diluent, and, if desired, other film-forming materials, extenders, fillers or driers, and then apply the resulting mixture to the surface to be coated. Film-forming materials that can be used with the epoxy material in this manner include the drying oils, such as tung oil, linseed oil, dehydrated castor oil, soybean oil and the like; cellulose derivatives such as cellulose nitrate, cellulose acetate, cellulose acetate butyrate, ethyl cellulose and mixtures thereof; the vinyl polymers, such as polymers of vinyl chloride, vinylidene chloride, acrylonitrile, acrylates, diallyl phthalate, ethylene, propylene, butylene, rubbery polymers from butadiene and isoprene and the like; coal tars, pine oils, and asphalts and other types of bituminous materials. The coatings prepared in this manner may be allowed to set hard at room temperature or heat may be applied to hasten the cure.

The higher molecular weight hydroxy-containing derivatives of the epoxy resins as described above are particularly suited for use in preparing coating compositions as they may be reacted through the hydroxyl group or groups with drying oil fatty acids or may be cured through the hydroxyl groups with compounds such as urea or polyisocyanates.

The new epoxy resins and higher molecular weight derivatives may also be employed with appropriate curing agents in the preparation of valuable adhesives and laminating compositions. In utilizing the products in these applications, it is generally desirable to combine the epoxy resins with fillers and curing agents and then use the spreadable fluid as adhesive for materials such as wood, plastic, metal and the like.

In addition, the new epoxy ethers may be used as stabilizing agents for various halogen-containing polymers, and particularly the vinyl halide polymers. These products may be used as stabilizers, alone or in combination with other stabilizing agents, such as urea and thiorea derivatives. In most cases, the products are effective as stabilizers in amounts varying from about 1% to 5% by weight of the polymer being stabilized. The epoxy materials may be combined with the halogen-containing polymer by any suitable method, such as by dissolving the products in a suitable solvent or by milling the products together on a suitable roll mill.

The new epoxy ethers are particularly attractive for use in aqueous systems where the methylol groups facilitate the dissolution or emulsion of the resin in the water. This makes the new ethers of value in making water-based coating compositions, adhesives, impregnating compositions, solutions for treating cloth, paper, leather and the like, to impart improved properties thereto.

To illustrate the manner in which the invention may be carried out, the following examples are given. It is to be understood that the examples are for the purpose of illustration and the invention is not to be regarded as limited to any of the specific compounds or conditions recited therein. Unless otherwise specified, parts disclosed in the examples are parts by weight.

EXAMPLE I

This example illustrates the preparation and some of the properties of a dimethylol-substituted diglycidyl ether of 2,2-bis(4-hydroxyphenyl)propane of the following formula

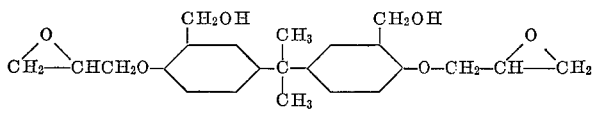

604 parts of 2,2-bis(4-hydroxyphenyl)propane was dissolved in 320 parts of methanol and 94 parts of water, 460 parts of a 37% formalin solution and 57 parts of a 20% aqueous sodium hydroxide solution were added thereto. This mixture was heated at 82° C. for about 20 minutes. The resulting product was then neutralized with dilute sulfuric acid and the mixture distilled to remove the methanol. A 5 molar excess of epichlorohydrin was then added and the mixture stirred at room temperature. The mixture was then allowed to stand until the water phase had separated. The organic phase was removed and 25% by weight of methanol added. This mixture was heated to reflux and 5% molar excess concentrated sodium hydroxide added. At the conclusion of the reaction, the excess epichlorohydrin and methanol was stripped at 125–130° C. at 25 mm. The resulting product which was a mixture of resin and salt was dissolved in methyl isobutyl ketone and filtered. The product was then stripped at 150° C. at 2 mm. to remove the solvent and give a soft solid resin having an epoxy value of 0.37 eq./100 g., hydroxyl, 0.05 eq./100 g., mole weight 515±15 calc. values epoxide 0.90, hydroxyl 0.50 and mol weight 400.

150° C. by removing the solvent. The product formed by this reaction had the formula

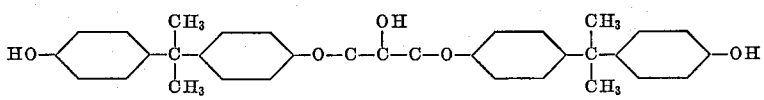

EXAMPLE II

Thirty parts of the dimethylol-substituted diglycidyl ether produced in Example I was combined with 70 parts of the unsubstitued diglycidyl ether of 2,2-bis(4-hydroxyphenyl)propane and the mixture combined with 13 parts of meta-phenylene diamine. The mixture was heated for one hour at 100° C. and 24 hours at 180° C. The resulting product had a heat distortion point of 191° C. compared to about 150° C. for the unsubstituted ether alone.

EXAMPLE III

This example illustrates the preparation and properties of a tetramethylol-substituted diglycidyl ether of 2,2-bis-(4-hydroxyphenyl)propane of the following formula

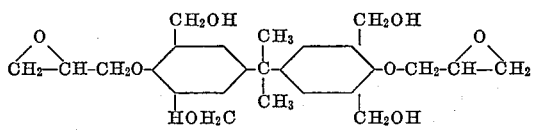

457 parts of 2,2-bis(4-hydroxyphenyl)propane was dissolved in 300 parts of methanol and to this mixture was added 400 parts of a 37% formalin solution, 47 parts of 20% aqueous sodium hydroxide solution and 300 parts of water. This mixture was allowed to stand at room temperature for six days and then 320 parts of a 37% formalin solution was added and the mixture allowed to stand for an additional eight days. This mixture was neutralized with dilute sulfuric acid and then distilled to remove the methanol. A ten molar excess of epichlorohydrin was added and the mixture stirred at room temperature. The mixture was allowed to stand until the water phase separated. The organic phase was removed and combined wih 25% by weight of methanol. The solution was heated to reflux and concentrated caustic was added to give 5% excess based upon the phenolic hydroxyl content. At the end of the reaction, the excess epichlorohydrin and methanol were stripped off at 125–130° C. at 25 mm. The product was dissolved in methyl isobutyl ketone, filtered to remove the salt and stripped at 130° C. at 2 mm. to give a soft solid resin having about four methylol groups per bisphenol group. The product had an epoxy value of .25 eq./100 g., OH value .77 eq./100 g.

EXAMPLE IV

This example illustrates the preparation and some of the properties of a dimethylol substituted diglycidyl ether of the following formula

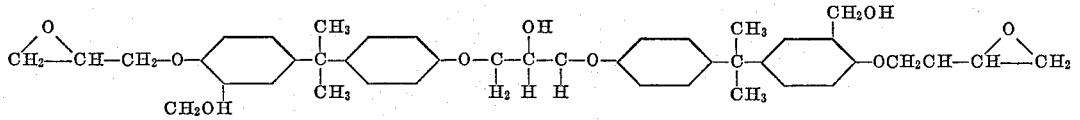

A polyhydric phenol containing 2 units of the 2,2-bis(4-hydroxyphenyl)propane was prepared by dissolving 228 parts of 2,2-bis(4-hydroxyphenyl)propane in 200 parts of methanol and to this mixture was added 46 parts of epichlororhydrin, 25 parts of 20% aqueous sodium hydroxide and 25 parts of water. The solution was refluxed for 2 hours at 74° C. after which the temperature was raised to 150° C. by removing the solvent. The product formed by this reaction had the formula

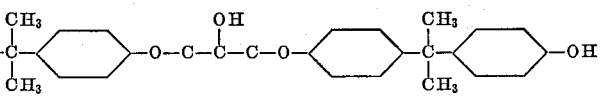

To the above-described reaction mixture was added 85 parts of 37% formalin solution, 25 parts of 20% aqueous sodium hydroxide and 25 parts water and 20 parts of methanol. This mixture was refluxed at 76° C. for ½ hour. The mixture was then neutralized with 15% sulfuric acid and the methanol stripepd off. 840 parts of epichlorohydrin was used to dissolve the resin and the mixture was allowed to stand until an aqueous and organic phase separated. The organic phase was removed and combined with 150 parts of methanol and 40 parts of concentrated sodium hydroxide solution. This mixture was refluxed for ½ hour and the solvents were removed at 120° C. at 23 mm. The resulting product which was a mixture of resin and salt was dissolved in 500 parts of methyl ethyl ketone and filtered. The filtrate was stripped at a temperature of 140° C./2 mm. Hg to remove the solvent. The resulting product was a hard solid resin having the above structure and an epoxy value of .26 eq./100 g., hydroxyl value 0.49 eq./100 g. and a molecular weight of 620. The calculated values are epoxy value .30 eq./100 g., hydroxyl .44 eq./100 g., and mol weight at 684.

EXAMPLE V

This example illustrates the preparation and properties of a dimethylol substituted diglycidyl ether of 2,2-bis(4-hydroxyphenyl)propane having the structure

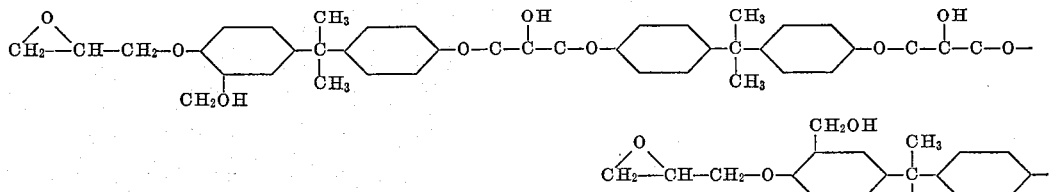

228 parts of 2,2-bis(4-hydroxyphenyl)propane, 170 parts of diglycidyl ether of 2,2-bis(4-hydroxyphenyl)propane and 175 parts of methanol were combined together and 2 parts of potassium hydroxide added at room temperature. The mixture was heated to 145° C. for one hour and the methanol was removed by distillation. The resulting product was a polyhydric phenol of the above structure free of the ether groups and methylol groups.

175 parts of methanol was added to the reaction mixture along with 85 parts of 37% formalin, 30 parts of sodium hydroxide and 50 parts of water. This mixture was refluxed for ½ hour. The mixture was neutralized with sulfuric acid and the methanol removed by distillation. A ten molar excess of epichlorohydrin was then added and the product allowed to stand at room temperature. The mixture separated into an aqueous and organic phase and the organic phase was removed and combined with 25% by weight of methanol. This mixture was heated to reflux and 5% excess of concentrated sodium hydroxide added. At the completion of the reaction the excess epichlorohydrin and methanol were stripped at 125–130° C. at 25 mm. leaving a desired resin salt mixture. The product was dissolved in methyl ethyl ketone, filtered and then stripped to yield the desired resin. The resulting product had the above-described structure and had an epoxy equivalency of .188 eg./100 g.

EXAMPLE VI

This example illustrates the preparation and properties of dimethylol substituted tetraglycidyl ether of 1,1,2,2-tetrakis(4-hydroxyphenyl)ethane having the structure

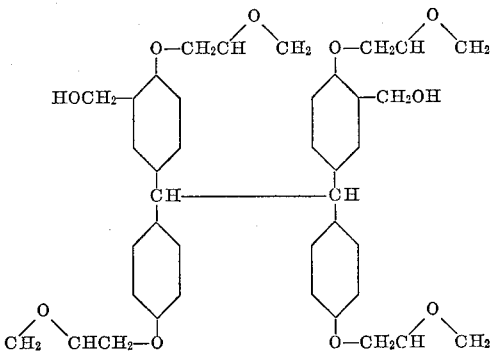

398 parts of 1,1,2,2-tetrakis(4-hydroxyphenyl)ethane was combined with 250 parts of methanol, 170 parts of 37% formalin solution, 36 parts of sodium hydroxide in 65 parts of water. This mixture was heated to reflux for ½ hour and then the mixture was neutralized with dilute sulfuric acid. Methanol was removed by distillation and 2600 parts of epichlorohydrin were added and this mixture was allowed to stand at room temperature. The organic phase that separated was then removed and combined with 200 parts of methanol and heated to reflux. 165 parts of sodium hydroxide were then added over a period of 30 minutes and the mixture refluxed for an additional 30 minutes. The mixture was stripped of excess epichlorohydrin and methanol at 130° C. and 25 mm. and the resulting product dissolved in methyl ethyl ketone, filtered and stripped at 130° C. at 2 mm. The resulting product was a hard solid having the above-described resin. The product had an epoxy value of .388 eq./100 g., and a hydroxyl value of .538 eq./100 g., mol wt. 730±25.

EXAMPLE VII

The polyepoxide resins produced in Examples I to VI were combined with equivalent amounts of each of the following epoxy curing agents: dicyandiamide, diethylene triamine, boron trifluoride-ethyl amine complex, ethyl maleic anhydride, meta-diphenylene diamine, and a polyamide of dimerized linoleic acid and ethylene diamine. In each the resulting mixtures were added at 100° C. for several hours. In each case hard, clear resins were obtained.

EXAMPLE VIII

The dimethylol-substituted diglycidyl ether of 2,2-bis(4-hydroxyphenyl)propane produced in Example I was combined with 25% of butyl glycidyl ether. The viscosities of the resulting solutions at 25° C. were 82 poises. This solution was combined with an equivalent amount of meta-phenylene diamine and cured at 100° C. The resulting product was a hard, tough, heat-resistant product.

EXAMPLE IX

This example illustrates the preparation and some of the properties of a glycidyl polyether of a dimethylol-substituted novolac resin based on 2,2-bis(4-hydroxyphenyl)-methrone.

105 parts of a novolac resin of formula

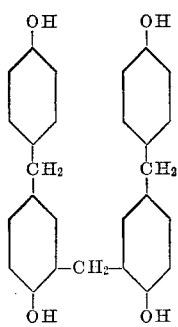

was combined with 42.5 parts of 37% formalin solution, 10 parts of sodium hydroxide and 500 parts of methanol. The mixture was heated to reflux and maintained there for 30 minutes. 925 parts of epichlorohydrin was added, the mixture heated to reflux and 74 parts of sodium hydroxide in 85 parts of water was added. The mixture was refluxed for ½ hour and the volatiles removed to 130° C. and 25 mm. The resulting product was dissolved in methyl ethyl ketone, filtered and stabilized at 135° C. and 2 mm. The resulting solid resin was identified as the glycidyl polyether of the above-described dimethylol-substituted novolac resin. The resin cured readily with diethylene triamine and with meta-phenylene diamine to form hard insoluble infusible cured products.

EXAMPLE X

A diglycidyl ether of dimethylol-substituted diphenyl oxide was prepared by mixing 100 parts of dihydroxy diphenyloxide with 100 parts of 37% formalin solution, 10 parts sodium hydroxide and 500 parts of methanol and heating to reflux for 30 minutes. 850 parts of epichlorohydrin was added along with 65 parts of sodium hydroxide dissolved in 70 parts of water. The mixture was refluxed for 30 minutes. The volatiles were removed at 130° C. and 25 mm. The resulting product was dissolved in methyl ethyl ketone, filtered and flasked to remove solvent. The resulting product was a solid resin identified as the above product which could be easily cured with diethylene triamine and meta-phenylene diamine.

I claim as my invention:

1. A glycidyl ether of a polynuclear polyhydric phenol having at least two methylol groups attached to different aromatic ring carbon atoms, the etherification being only on the phenolic OH groups.

2. A claim as in claim 1 wherein at least one of the aromatic rings contains 2 to 4 methylol groups.

3. An epoxy resin composition comprising the epoxy ether defined in claim 1 and a fluid liquid monoepoxy diluent.

4. A cured product obtained by reacting the epoxy ether defined in claim 1 with an epoxy resin curing agent.

5. A hard insoluble infusible product obtained by reacting the epoxy ether defined in claim 1 with an epoxy curing agent of the group consisting of polyamines, amino-containing polyamides, polycarboxylic acids and their anhydrides, boron trifluoride and its complexes, metal salts, hydrazides, polymercaptans, urea-formaldehyde and phenol-formaldehyde resins.

6. A cured product obtained by heating and reacting a mixture containing an epoxy ether defined in claim 1 and a dissimilar polyepoxide with an epoxy curing agent of the group consisting of polyamines, amino-containing polyamides, polycarboxylic acids and their anhydrides, boron trifluoride and its complexes, metal salts, hydrazides, polymercaptans, urea-formaldehyde and phenol-formaldehyde resins.

7. An epoxy resin composition containing the product of claim 1 and 10–90% by weight of a member of the group consisting of coal tars, asphalts and pine oil.

8. A compound of the formula

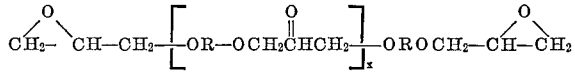

wherein at least one R radical contains a dimethylol-substituted aromatic ring and the remaining R's are unsubstituted aromatic radicals, and $x$ is an integer of 0 to 10.

9. A claim as in claim 8 wherein R is a compound of the formula

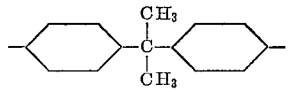

and $x$ is an integer from 0 to 5.

10. A claim as in claim 9 wherein $x=0$.

11. A polyglycidyl ether of a phenol of the structure

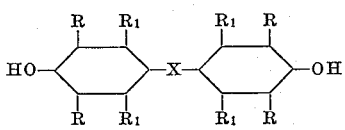

wherein X is a bivalent radical containing elements only of the group consisting of hydrogen, carbon, halogen, sulfur and oxygen, at least two R's are methylol groups with the remaining R's and the $R_1$ being a member of the group consisting of hydrogen, hydrocarbon radicals, alkoxy radicals and carboalkoxy radicals containing no more than 12 carbon atoms.

12. A process for preparing new epoxy ethers which comprises reacting a di-methylol-substituted polyhydric phenol with an epoxy forming material of the group consisting of epichlorohydrin and dichlorohydrin in the presence of an alkaline material.

References Cited

UNITED STATES PATENTS 2,765,288  10/1956  Whittier _____ 260—28
2,844,553  7/1958   Taylor _____ 260—19

OTHER REFERENCES

Martin, R. W.: "The Chemistry of Phenolic Resins," J. Wiley & Sons, 1956, pp. 38, 39, 87–90 and 240.

Lee et al.: "Epoxy Resins," McGraw-Hill Book Co. Ltd., 1957, pp. 15, 41, 141 and 142.

MORRIS LIEBMAN, Primary Examiner

S. L. FOX, Assistant Examiner

U.S. Cl. X.R.

260—14, 844, 845, 847, 51